A. S. KROTZ.
GEARING.
APPLICATION FILED DEC. 27, 1909.
1,003,052.
Patented Sept. 12, 1911.
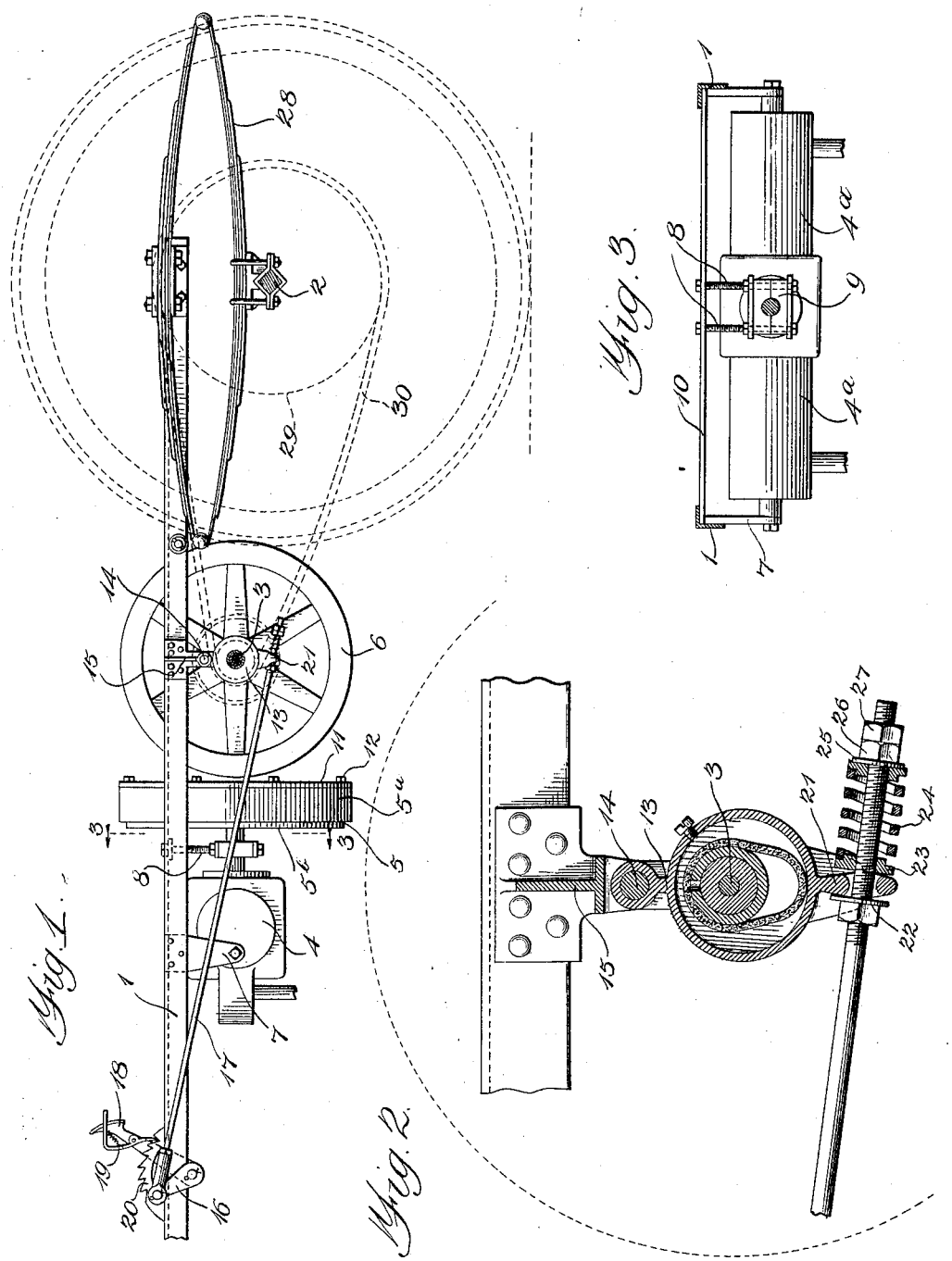

UNITED STATES PATENT OFFICE.

ALVARO S. KROTZ, OF CHICAGO, ILLINOIS, ASSIGNOR TO SEARS, ROEBUCK & COMPANY, OF CHICAGO, ILLINOIS, A CORPORATION OF NEW YORK.

GEARING.

1,003,052.  Specification of Letters Patent.  Patented Sept. 12, 1911.

Original application filed December 16, 1908, Serial No. 467,866. Divided and this application filed December 27, 1909. Serial No. 535,220.

*To all whom it may concern:*

Be it known that I, ALVARO S. KROTZ, a citizen of the United States, residing at Chicago, in the county of Cook and State of Illinois, have invented certain new and useful Improvements in Gearing, of which the following is a specification.

This application is a division of my application Serial No. 467,866, filed December 16, 1908.

This invention relates more especially to the means for transmitting the driving power to the driving wheels of an automobile.

One of the objects of this invention is to produce improved means for connecting and disconnecting the source of motive power and the driven parts.

Another object is to provide an adjustable mounting for one of the friction driving members whereby the axes of said members may be readily positioned in the same plane without extreme care in mounting said members.

Another object is to provide a transmission or drive which shall be flexible enough to accommodate itself to sudden strains and shocks, whereby breakage and noise are reduced to a minimum.

In the accompanying drawings Figure 1 is a fragmental side elevation of the running gear of a motor vehicle embodying the features of my invention. Fig. 2 is a sectional view through the drive shaft and its supporting means. Fig. 3 is a section on line 3 3 of Fig. 1.

That embodiment of my invention which is herein illustrated comprises a chassis having longitudinal sills 1, 2 indicating the rear axle, 3 the drive shaft, and 4 the engine. I have herein shown a frictional driving connection between the engine and the drive shaft comprising the engine flywheel or friction disk 5, and a friction wheel 6 mounted upon the shaft 3, said friction wheel being arranged for peripheral contact with the face of the friction disk 5. The friction wheel 6 may be moved longitudinally of the shaft 3 to obtain various speeds forward and backward in the customary way, such means not being illustrated, as it forms no part of the present invention.

The engine herein shown comprises two opposed cylinders 4ᵃ arranged transversely of the chassis. I preferably support the engine by means of brackets 7 secured to the sills 1 and pivotally connected with the outer ends of the cylinders 4ᵃ, and a hanger 8 supporting the bearing 9 of the engine shaft and adjustably connected with a cross bar 10 of the chassis. It will thus be seen that the engine has a three-point support in the chassis, and that by adjusting the hanger 8, the engine may be positioned so that the axis of the engine shaft intersects the axis of the drive shaft 3. This manner of supporting the engine obviates the necessity for extreme nicety in the manufacture of the engine supports or in mounting the engine on the car.

The fly-wheel 5 may be faced with a removable wear plate 11 of suitable material. The plate 11 is secured to the fly-wheel 5 by means of screws 12. It will be seen that said wear plate may be removed and reversed, or a new plate substituted for it, at slight expense of time and labor.

The drive shaft 3 is herein represented as suspended from the longitudinal sills 1 by means of bearing members 13 hinged at 14 to hanger 15 fixed to said sills. The means just described for supporting the shaft 3 permits of moving said shaft into and out of driving connection with the fly-wheel 5. The means herein shown for thus moving the shaft 3 comprises a crank arm 16 pivotally mounted on the chassis and connected to the lower end of one of the bearing members 13 by means of a link 17. Preferably a crank arm 16 and a link 17 are provided for each end of the shaft 3, the crank arms being fixed with relation to each other. Connected with the crank arms 16 is suitable controlling means, such as a foot-lever 18 fixed with relation to said crank arms and carrying a detent 19 adapted to engage a segment 20.

As shown in Fig. 1, the link 17 extends through a perforated lug 21 upon the lower side of the bearing member 13, said lug bearing at one side upon a nut and washer 22 or equivalent device on the link 17, and at its opposite side against a washer 23 slidably mounted upon the link 17. A coiled spring 24 bears at one end against the washer 23 and at its other end against a washer 25. The latter washer is held in place by means of an adjusting nut 26 and set nut 27. Preferably the spring 24 possesses sufficient tension to prevent its yielding except when the drive wheels are subjected to unusual shocks or stresses. Under ordinary circumstances the friction wheel 6 is positively and rigidly held in driving contact with the fly-wheel 5.

The chassis is supported upon the axles in any suitable way, as by means of springs 28, only one of which springs is shown in the drawing. The spring 28, in this instance, is of elliptical form, the lower half being rigidly secured to the axle 2 and the upper half being firmly connected to the adjacent sill 1. Fixed in any suitable way with relation to each drive wheel is a sprocket wheel 29 that carries a drive chain 30 extending over the sprocket wheel mounted upon and suitably connected with the drive shaft 3.

Excessive slack in the chain 30 may be taken up by moving the shaft 3 forward. To permit of such movement of the shaft, the fly-wheel 5 may be formed in two sections 5ª and 5ᵇ, the section 5ª being made adjustable toward and away from the section 5ᵇ by any suitable means (not shown) to correspond with the altered position of the shaft 3.

I claim as my invention:

1. In an automobile, the combination of a drive shaft; a friction wheel on said shaft; a second shaft; a friction disk on the second shaft arranged to contact said wheel; and means for laterally moving the last mentioned shaft to adjust said disk so that the axis of said disk intersects the axis of said drive shaft.

2. In an automobile, the combination of a drive shaft; a friction wheel on said shaft; a second shaft; a friction disk on the second shaft arranged to contact with said wheel; and a bearing in which the last mentioned shaft is mounted, said bearing being adjustable to laterally position said shaft transversely of said drive shaft so that said disk shall be in proper relation to said wheel.

3. In an automobile, the combination of a support; a vertically adjustable bearing attached to said support; a horizontal engine shaft rotatably mounted in said bearing; a friction disk on said shaft; a horizontal drive shaft rotatably mounted on said support at right angles to said engine shaft; and a friction wheel on said drive shaft arranged to contact said friction disk.

4. In an automobile, the combination, of a support; an engine pivotally attached to said support and having a rotary shaft; a bearing on the support for said shaft; a friction disk on said shaft; a drive shaft rotatably mounted in said support; a friction wheel on said drive shaft, the periphery of said wheel contacting the face of said disk; and means for adjusting said bearing to position said engine shaft so that its axis intersects the axis of said drive shaft.

5. The combination, with a friction disk, of means for rotating said disk; a shaft; movable bearings for said shaft; a friction wheel on said shaft arranged for peripheral contact with said friction disk; and means for holding said wheel in contact with said disk, said means comprising a link; means at one end of said link for longitudinally moving the link; a spring on the other end of said link bearing against one side of one of said movable bearings and of sufficient stiffness to be unyielding under usual stresses, and a portion rigid on said link at the opposite side of said movable bearing.

ALVARO S. KROTZ.

Witnesses:
E. M. ARMBRUSTER,
A. M. ZIMMERMAN.

Copies of this patent may be obtained for five cents each, by addressing the "Commissioner of Patents, Washington, D. C."